US006579601B2

(12) United States Patent
Kollaja et al.

(10) Patent No.: US 6,579,601 B2
(45) Date of Patent: Jun. 17, 2003

(54) CONFORMABLE MULTILAYER FILMS

(75) Inventors: Richard A. Kollaja, Dusseldorf (DE); David D. Nguyen, Savage, MN (US); Ronald S. Steelman, Woodbury, MN (US); Buren R. Ree, Stillwater, MN (US); Steven D. Solomonson, Shoreview, MN (US); Philip D. Radovanovic, Duesseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 73 days.

(21) Appl. No.: 09/778,523

(22) Filed: Feb. 7, 2001

(65) Prior Publication Data
US 2001/0008687 A1 Jul. 19, 2001

Related U.S. Application Data

(63) Continuation-in-part of application No. 09/419,260, filed on Oct. 15, 1999, now abandoned.

(51) Int. Cl.$^7$ .......................... B32B 7/02; B32B 27/08; H05B 6/00
(52) U.S. Cl. ................. 428/212; 428/213; 428/220; 428/343; 428/354; 428/500; 428/515; 428/516; 264/464; 264/472
(58) Field of Search ............... 428/515, 500, 428/516, 343, 354, 212, 213, 217, 220; 264/464, 472

(56) References Cited

U.S. PATENT DOCUMENTS

| | | | |
|---|---|---|---|
| 2,736,721 A | 2/1956 | Dexter | 260/42 |
| RE24,906 E | 12/1960 | Ulrich | 206/59 |
| 3,565,985 A | 2/1971 | Schrenk et al. | 264/171 |
| 3,647,612 A | 3/1972 | Schrenk et al. | 428/213 |
| 4,833,179 A | 5/1989 | Young et al. | 522/183 |
| 4,908,278 A | 3/1990 | Bland et al. | 428/500 |
| 5,082,715 A | 1/1992 | Lasch et al. | 428/143 |
| 5,112,696 A | 5/1992 | Roberts | 428/516 |
| 5,209,971 A | 5/1993 | Babu et al. | 428/343 |
| 5,389,324 A | 2/1995 | Lewis et al. | 264/171 |
| 5,427,842 A | 6/1995 | Bland et al. | 428/213 |
| 5,461,134 A | 10/1995 | Leir et al. | 528/14 |
| 5,589,122 A | 12/1996 | Leonard et al. | 264/146 |
| 5,599,602 A | 2/1997 | Leonard et al. | 428/56 |
| 5,660,922 A | 8/1997 | Herridge et al. | 428/214 |
| 5,766,744 A | 6/1998 | Fanselow et al. | 428/213 |
| 6,040,061 A | 3/2000 | Bland et al. | 428/480 |
| 6,045,648 A | 4/2000 | Palmgren et al. | 156/272.4 |
| 6,436,531 B1 * | 8/2002 | Kollaja et al. | 428/355 R |

FOREIGN PATENT DOCUMENTS

| | | |
|---|---|---|
| EP | 0 763 422 A1 | 3/1997 |
| WO | WO 93/07228 | 4/1993 |
| WO | WO 95/04655 | 2/1995 |
| WO | WO 99/28128 | 6/1999 |
| WO | WO 00/05305 | 2/2000 |

* cited by examiner

Primary Examiner—Paul Thibodeau
Assistant Examiner—Monique R. Jackson
(74) Attorney, Agent, or Firm—Kent S. Kokko

(57) ABSTRACT

Conformable multilayer films having alternating layers of a stiff polymeric material and a flexible polymeric material are described.

31 Claims, No Drawings

CONFORMABLE MULTILAYER FILMS

This is a continuation-in-part of application Ser. No. 09/419,260, filed Oct. 15, 1999, now abandoned.

TECHNICAL FIELD

This invention relates to conformable films, and more particularly, to multilayer films having alternating layers of a stiff polymeric material and flexible polymeric material.

BACKGROUND OF THE INVENTION

There is an ongoing need for conformable, non-yielding films, which may be bonded to uneven and/or irregular surfaces and having a variety of new properties not possessed by current products.

Polyvinyl chloride (PVC) films and tapes are conventionally used for a wide variety of applications. One prevalent use is for auto paint masking applications. PVC has many properties that are advantageous for such applications. For example, PVC films are known to be conformable to the varying topographies present on an automobile's exterior.

One disadvantage of PVC films, however, is the accompanying use of plasticizers in PVC films. Plasticizers are typically needed in PVC films in order to make the films more flexible, lower the glass transition temperature of the films, and make the films more conformable. However, plasticizers can migrate to the substrate on which PVC films are adhered, leaving a residue or "ghosting" when removed. The ghosting is not removable with solvent wipes. Thus, the exterior appearance of the automobile may be detrimentally affected when PVC films are used as the tape backing in auto paint masking tapes. Furthermore, such plasticizers may degrade adjacent adhesive layers, reducing the adherence of the tape to the automobile.

Multilayer films have also been described. For example, constructions having up to several thousand layers of alternating polymers with different refractive indices have been shown to have mirror-like properties. Also, films that are severable or have puncture resistance have been made by using alternating layers of stiff and ductile polymers as described in U.S. Pat. Nos. 4,908,278 and 5,427,842 (Bland et al.). Pressure sensitive adhesive tapes are also known that have multilayered films as the backings on which the pressure sensitive adhesive is coated.

Although a variety of properties have been accomplished with such multilayered constructions, there is still a need for conformable, non-yielding film products to replace poly (vinyl chloride) films.

SUMMARY OF THE INVENTION

It is desired to have alternative compositions for use in tape backings and films. It is particularly desired to have alternative compositions for use in graphics applications, where stress relaxation and strain recovery properties are important and in auto paint masking tapes, where, in addition, minimal ghosting is also desired.

For graphics film and paint masking applications, it is desirable to have an easy to apply, conformable, non-yielding film that has good stress relaxation and low strain recovery to enable the film to be applied over irregular surfaces without delaminating or releasing from the substrate surface ("popping up"). In addition the graphics films should be printable (i.e. to have a receptive surface for printing and/or graphics) and exhibit good weathering for outdoor applications. A disadvantage of PVC and flexible polyolefin films is that they have poor stress relaxation, strain recovery properties and/or ghosting.

The present invention provides unified multilayer films having alternating layers of stiff and flexible polymeric materials. Preferably, multilayer films of the present invention are no greater than about 250 micrometers (em) thick. In one embodiment, multilayer films have a construction of alternating layers of different stiff materials or different flexible materials.

In any one construction of the alternating layers of stiff material and a flexible material, each of the stiff layers typically includes the same material or combination of materials, although they may include different materials or combinations of materials. Similarly, each of the layers that is flexible typically includes the same material or combination of materials, although they may include different materials or combinations of materials.

Preferably, multilayer films of the present invention have a unified construction of at least 10 substantially contiguous layers of organic polymeric material, more preferably, at least 13 layers, even more preferably, at least 29 layers, although as few as 5 layers are possible or two layers with certain materials. In certain embodiments, there are at least three layers of the same stiff material and often, at least three layers of the same material that is a flexible material.

The two outermost layers of multilayer films of the present invention can include one or more stiff materials, which may be the same or different in each of the two outermost layers. Alternatively, the two outermost layers can include one or more materials that are flexible materials, which may be the same or different in each of the two outermost layers. Furthermore, the inventive films include embodiments in which only one of the outermost layers includes a stiff material.

Multilayer films of the present invention can also be oriented, either in one or two directions, if so desired. In addition, the films can be annealed by running the film over hot rolls, through an oven or heating the film with an infrared heater. In certain embodiments of the present invention, the multilayer films can include a layer that is flexible, a stiff material layer, and a tie layer therebetween.

The present invention also provides a process of preparing a multilayer film. The process includes melt processing organic polymeric material to form a unified construction of at least 2, preferably at least 5, substantially contiguous layers of organic polymeric material, the construction comprising layers of stiff organic polymeric materials alternating with layers of flexible organic polymeric material. Preferably, all the layers are substantially simultaneously melt processed, and more preferably, all the layers are substantially simultaneously coextruded.

Another aspect of the present invention provides a multilayer film having a unified construction and a total thickness of no greater than about 250 micrometers; the construction comprising layers comprising a stiff material alternating with layers comprising a material that is flexible.

In another aspect, the present invention provides a multilayer film having alternating layers of stiff and flexible materials and further having a layer of pressure sensitive adhesive.

In another aspect, the present invention provides a multilayer film having alternating layers of stiff and flexible materials and further having a layer of a material, such as a thermoplastic layer or primer layer, to improve the ink receptivity of the surface.

A further aspect of the present invention provides a process of preparing a multilayer film, the process comprising melt processing organic polymeric material to form a unified construction of at least 2, preferably at least 5, substantially contiguous layers of organic polymeric material, the construction comprises layers comprising a stiff material alternating with layers comprising a material that is flexible.

Herein, the following definitions are used:

"Stiff materials" comprises thermoplastic polymers and blends of polymers having a Young's modulus greater than about 207 MPa (30,000 psi), more preferably greater than about 345 MPa (50,000 psi), even more preferably greater than about 517 MPa (75,000 psi).

"Flexible materials" comprises thermoplastic polymers and blends of polymers having a Young's modulus less than about 172.4 MPa (25,000 psi), more preferably less than about 68.9 MPa (10,000 psi) and most preferably from about 0.69 to 68.9 MPa (100 to 10,000 psi).

"Unified" means that the layers are not designed to be separated or delaminated as would a pressure sensitive adhesive tape in roll form.

"Melt viscosity" means the viscosity of molten material at the processing temperatures and shear rates employed.

"Conformability" means that the film accommodates curves, depressions or projections on a substrate surface so that the film may be stretched around curves or projections, or may be pressed down into depressions without breaking or delaminating the film and preferably with minimal necking.

"Contiguous" or "substantially contiguous" means sharing a common surface or interface between adjacent layers.

DETAILED DESCRIPTION OF PREFERRED EMBODIMENTS

The present invention is directed to multilayer products (e.g., a single- or double-sided pressure sensitive adhesive tape or sheeting, a backing for a tape or sheeting or a pressure sensitive adhesive film) in the form of films of organic polymeric material, wherein the film layers that include stiff materials alternate with layers that include flexible materials. In other preferred embodiments there are alternating layers of different stiff materials (e.g., alternating layers of two different stiff materials). The two outermost layers of the films may include stiff materials, materials that are flexible, or one of the outermost layers may include a stiff material and the other a material that is flexible. Each layer of the construction is continuous and has a substantially contiguous relationship to the adjacent layers. Preferably, each layer is substantially uniform in thickness. The multiple layers in any one construction are "unified" into a single multilayer film such that the layers do not readily separate.

The multilayer article has a Young's modulus of from about 10,000 to 150,000 psi (69 to 1034 MPa) at the use temperature, an elongation of 100% or more at a strain rate of 600% per minute, and a strain recovery of less than 55% over 24 hours. By use temperature it is meant the temperature to which the film, after applied to a substrate, is exposed. For automotive paint masking applications, the use temperature can reach 325° F. In most cases the use temperature will be room temperature, however the film may be exposed to use temperatures considerably above or below this value, as when the film is applied to a substrate outdoors or other surfaces that are exposed to outdoor conditions. Preferably the multilayer article has a residual stress of 60% or less, most preferably of 40% or less.

It will be understood by those skilled in the art that the elongation is dependent on the strain rate, and that higher elongation values are achievable at lower strain rates, and lower elongation values are achievable at higher strain rates.

Further, the multilayer article preferably has minimal necking, preferably 25% or less and more preferably 5% or less when tested according to ASTM D 882-95A and the necking test described herein. Necking refers to a film's tendency to undergo plastic deformation under strain and yield irrecoverably. When films are used as tape backings, necking can result in irregular tape lines during application.

The Young's modulus of the multilayer film may be conveniently varied by appropriate selection of the flexible material and the stiff material and by selection of the relative proportions of stiff and flexible materials (the weight percent of the stiff and flexible layers relative to the film weight). To maximize the conformability of the multilayer film, it is preferred that the film has a Young's modulus in the range of about 68.9 to 344.7 MPa (10,000 to 50,000 psi) for a 3–4 mil film (~76–102 micrometers). It will be understood that the preferred Young's modulus is affected by the overall thickness of the multilayer film, and the relative thickness and number of stiff and flexible layers. For example, the conformability of the multilayer film may be maintained in relatively thinner films—in the 1–3 mil thickness range (25–76 micrometers), when using materials having a relatively higher Young's modulus. To maximize the relaxation behavior, strain recovery and the handleability (ease of manipulation, particularly when using large sheets) of the film, it is preferred that that the film has a Young's modulus in the range of about 344.7 to 1034.2 MPa (50,000 to 150,000 psi).

Stiff materials useful in the present invention comprise amorphous and semicrystalline thermoplastic homo- and copolymers (and mixtures and blends thereof). Useful amorphous polymers generally have a glass transition temperature ($T_g$) of greater than 50° C. (preferably greater than 70° C.), such that the stiff layers have a Young's modulus greater than about 207 MPa (30,000 psi). Typically the stiff materials have an elongation less than 100% when measured at a strain rate of 600% per minute. Further, the stiff materials have an elongation greater than 10% at a strain rate of 600% per minute. Polymers having an elongation of less than 10% may be used provided the material is blended with another polymer so that the blend has an elongation of greater than 10%, or that the stiff material is used in amount of less than 25 weight percent of the multilayer article, preferably less than 10 weight percent. It has been observed that multilayer articles having greater than about 25 weight % of a stiff material (having less than 10% elongation) are too easily torn to be conformable.

Examples of useful stiff materials include homo- and copolymers of methyl methacrylate, styrene, alkyl styrenes such as α-methyl styrene, acrylonitrile and methacrylonitrile, copolymers of ethylene and vinyl alcohol (such as EVOH), polyesters, polyamides, polyurethanes; copolymers of ethylene and cyclic olefins, such as ethylene-norbornene copolymers, certain high modulus polypropylenes and polycarbonates. They generally have a melt flow index of 5 or less and are amorphous, colorless materials. These should not, however, be considered to be limiting features, because stiff materials which are crystalline or which have higher melt flow indices may be used (and may in fact be desired when the stiff material constitutes the outer layer). Preferred stiff materials are EVOH and copolymers of ethylene and cyclic olefins, either used alone or as a mixture with another stiff material.

Additionally, minor amounts of other materials may be added to the stiff polymer provided that the mixture meets the above described criteria. These additional materials may include flexible polymers, polymer additives such as plasticizers, antioxidants, colorants, flame retardants, UV stabilizers, heat stabilizers, and processing aids such as extrusion aids and lubricants. One may also use materials not normally considered stiff, such as flexible polymers, to which fillers have been added to increase the modulus.

The quantity of the stiff material used in the film is dependent upon the specific properties desired of the multilayer film. However, it has been found that from 5 to 80 percent by weight (preferably from 45 to 70 percent by weight) of the stiff material is desired, relative to the weight of the multilayer film, when the materials are coextruded in a multilayer film. Where the stiff material has an elongation of less than 10%, the material is preferably blended with another polymer so that the blend has an elongation of greater than 10%, or that the stiff material is used in amount of less than 25 weight percent of the multilayer article, preferably less than 10 weight percent.

Flexible materials useful in the present invention are thermoplastic homo- or copolymers, or mixtures and blends thereof. The flexible materials have a Young's modulus of less than or equal to 25,000 psi (172 MPa). Typically the flexible polymers are polyolefinic semicrystalline thermoplastic materials. Additionally, minor amounts of other materials may be added to the flexible polymer provided that the mixture meets the above-described criteria. These additional materials may include stiff polymers, polymer additives such as plasticizers, antioxidants, colorants, flame retardants UV stabilizers, heat stabilizers, and processing aids such as extrusion aids and lubricants.

Useful flexible materials have at least 100% elongation at a strain rate of 600% per minute when tested in tension at 25° C. The flexible materials are formulated to have minimal necking as defined in the test procedures below. The yield is that point at which a film of the material undergoes pronounced plastic deformation upon further application of strain. Thus the yield is manifested in a stress-strain plot at the first point where an increase in strain occurs without an increase in stress.

A number of materials are useful as the flexible material. Examples of such materials include homo- and copolymers of ethylene, propylene, butene and blends thereof, including copolymers of ethylene with vinyl acetate, acrylic acid, methyl methylacrylate, methacrylic acid, alpha-olefins such as hexene and octene; maleic anhydride grafted polyethylene or polypropylene; polyacrylates; polyamides, polyester resins and polyurethanes. Commonly a low modulus, flexible, preferably non-necking polyolefin is used as the flexible material. The polyolefin may be polyethylene containing 1-octene units, polypropylene with a high level of atactic content, and mechanical or reactor blends of polypropylene and an elastomer such as ethylene propylene rubber. These flexible polyolefins can be blended with polyethylenes or isotactic or syndiotactic polypropylene. Preferred flexible materials includes blends of homo- and copolymers of propylene with maleic anhydride grafted polypropylene.

The flexible materials can also include non-olefin polymers such as flexible polyamides, flexible polyester resins or flexible polyurethanes. Specific examples of these polymers and copolymers include, MACROMELT™ polyamides available from Henkel Inc., GRILONT polyamides available from EMS American Grilon Inc, VITEL polyesters available from Bostik USA, HYTREL™ polyesters available from DuPont, MORTHANE™ polyurethanes available from Morton International, ESTANE™ polyurethanes available from B.F. Goodrich, KRATON™ styrene/isoprene or styrene/butadiene copolymers (and corresponding hydrogenated copolymers) available from Shell Chemical Products Inc., polyesters and the like.

It has been found that from 20 to 95 percent by weight flexible material is generally useful. More preferably the film contains from about 30 to 55 percent by weight of the flexible material when extruded in a multilayer film. The quantity of flexible material utilized in the multilayer film is, of course, dependent upon the specific properties desired in the final film, and on the selection of a specific flexible and specific stiff material. For example, where the stiff material is brittle, such as polymethyl methacrylate, the resulting multilayer films tend to tear at high levels of the stiff material, so in such instances a relatively high level (80% or more) of flexible material is preferred. Conversely, when the stiff material is more ductile, such as with ethylene vinyl alcohol (EVOH), a relatively greater amount and a relatively broader range of compositions is useful.

It is noted than some classes of materials can be either stiff or flexible in an unmodified state. This is because that a class of polymer can be formed such that materials within that class can have a modulus that may span a wide range. For example, some forms of polypropylene, such as those described as isotactic or syndiotactic, have a modulus over 1170 MPa while other forms of polypropylene, such as atactic types, have a modulus below 30 MPa as known to the art. Similarly, some polyethylenes can have a modulus lower than 100 MPa (15,000 psi) to higher than 1380 MPa (200,000 psi) depending on whether the polyethylene is linear low density polyethylene (LLDPE), low density polyethylene (LDPE), high density polyethylene (HDPE) or ultra high molecular weight polyethylene (UHMWPE), all known to the art.

The materials of the stiff layer and the flexible layer can be combined in many configurations. A stiff layer may include stiff materials and flexible materials as long as the stiff layer meets the described limitations, such as modulus. Similarly, a flexible layer may include stiff and flexible materials as long as the flexible layer has a sufficiently low modulus. Stiff layers can have low elongation as long as the resulting multilayer film is able to be elongated 100% at a strain rate of 600% per minute. Thus, stiff layers composed of materials that only allow the stiff layer composition to elongate less than 10% may still be used, typically in smaller weight amounts of total film, as long as the resulting multilayer film is able to elongate sufficiently.

The materials of the stiff layer (A) and flexible layer (B) can be modified with one or more processing aids, such as plasticizers, to modify properties such as Young's modulus. Plasticizers useful with either stiff or flexible polymeric materials are preferably miscible at the molecular level, i.e., dispersible or soluble in the thermoplastic material. Examples of plasticizers include, but are not limited to, polybutene, paraffinic oils, petrolatum, liquid rubbers, and certain phthalates with long aliphatic side chains such as tridecyl phthalate. When used, a processing aid is typically present in an amount of about 5 parts to about 300 parts by weight, and preferably up to about 200 parts by weight, based on 100 parts by weight of the polymeric material. If plasticizers are used, it is preferred that they not be incorporated into the outermost layers (whether the outer layer is a flexible or stiff material) of the multilayer film, so the effects of plasticizer migration may be avoided.

These multilayer articles (i.e., multilayer films) are typically prepared by melt processing (e.g., extruding). In a preferred method, the layers are generally formed at the same time, joined while in a molten state, and cooled. That is, preferably, the layers are substantially simultaneously melt-processed, and more preferably, the layers are substantially simultaneously coextruded. Products formed in this way possess a unified construction and have a wide variety of useful, unique, and unexpected properties, which provide for a wide variety of useful, unique, and unexpected applications.

Preferably, the films are no greater than about 250 micrometers thick (more preferably, no greater than about 150 μm, and most preferably, no greater than about 100 μm). Such multilayer products have a construction of at least 2 layers, preferably, at least 5 layers, more preferably, at least 13 layers, and even more preferably, at least 29 layers. Depending on the materials and additives chosen, thicknesses of the layers, and processing parameters used, for example, the multilayer films will typically have different properties at different numbers of layers. That is, the same property (e.g., tensile strength, fire retardancy) may go through a maximum or a minimum at a different number of layers for two particular materials when compared to two other materials.

Multilayer films can include an $(AB)_n$ construction, with either A and/or B layers as the outermost layers (e.g., $(AB)_nA$, $(BA)_nB$, or $(AB)_n$). In such constructions, each of the A layers are stiff as a result of the incorporation of a stiff material, which may be the same or different in each layer, and each of the B layers is flexible as a result of incorporation of a flexible material, which may be the same or different in each layer. Multilayer films can also include an $(AA')_n$ construction, with A and/or A' layers as the outermost layers (e.g., $(AA')_nA$, $(A'A)_nA'$, or $(AA')_n$). In such constructions, each of the A and A' layers includes a different stiff material. In each of these constructions, n is preferably at least 2, and more preferably, at least 5, depending on the materials used and the application desired.

The multilayer articles exhibit a desirable combination of conformability and high stress relaxation and low strain recovery. The flexible material (commonly a polyolefin or polyolefin blend) is especially desirable for use in graphics marking applications or paint masking applications because the flexible polyolefin is economical and possesses the desired conformability and non-necking behavior. The flexible materials, however, are relatively elastic and exhibit inadequate stress relaxation and high strain recovery. By layering the stiff thermoplastic polymer with the flexible material, however, one can greatly reduce the elastic character of the film. Also, with multilayer coextrusion, one can reduce the thickness of the stiff thermoplastic layers to the point that the stiff polymer becomes ductile. The resulting films exhibit a synergistic combination of conformability and high stress relaxation with low strain recovery.

Preferred embodiments include one, preferably three or more layers of the same stiff material and at least one, preferably three or more layers of the same flexible material in alternating layers. Whether both of the outer layers are stiff or flexible, or whether only one of the outer layers is stiff and one is flexible, the multilayer films can be used as backing for single- or double-sided pressure sensitive adhesive tapes, for example. For preferred embodiments, there are generally no more than about 500 layers, more preferably, no more than about 200 layers, and most preferably, no more than about 100 layers, although it is envisioned that constructions having many more layers can be made using the materials and methods described herein.

The individual layers of multilayer films of the present invention can be of the same or different thicknesses. Preferably, each internal layer is no greater than about 5 micrometers (μm) thick, and more preferably, no greater than about 1 μm thick. Each of the two outermost layers can be significantly thicker than any of the inner layers, however. Preferably, each of the two outermost layers is no greater than about 150 μm thick. Typically, each layer, whether it be an internal layer or one of the outermost layers, is at least about 0.01 μm thick, depending upon the materials used to form the layer and the desired application.

Thus, multilayer films of the present invention can be used as films for graphic applications. This is because they have advantageous conformability, exhibit less than 25% necking, have good stress relaxation and strain recovery, and are dimensionally stable. Such desirable properties are believed to result from the incorporation of alternating layers of stiff and flexible materials. The multilayer films are also useful as tape backings for paint masking applications, where it is additionally preferred that the films exhibit less than 5% necking.

Suitable materials for use in preparing the films of the present invention, whether they are stiff or flexible materials, are melt processable. That is, they are fluid or pumpable at the temperatures used to melt process the films (e.g., about 50° C. to about 300° C.), and they are film formers. Furthermore, suitable materials do not significantly degrade or gel at the temperatures employed during melt processing (e.g., extruding or compounding). Preferably, such materials have a melt viscosity of about 10 poise to about 1,000,000 poise, as measured by capillary melt rheometry at the processing temperatures and shear rates employed in extrusion. Typically, suitable materials possess a melt viscosity within this range at a temperature of about 175° C. and a shear rate of about 100 seconds$^{-1}$.

In melt processing multilayer films of the present invention, the materials in adjacent layers need not be chemically or physically compatible or well matched, particularly with respect to melt viscosities, although they can be if so desired. That is, although materials in adjacent polymeric flowstreams can have relative melt viscosities (i.e., ratio of their viscosities) within a range of about 1:1 to about 1:2, they do not need to have such closely matched melt viscosities. Rather, the materials in adjacent polymeric flowstreams can have relative melt viscosities of at least about 1:5, and possibly up to about 1:20. For example, the melt viscosity of a flowstream of polymer B (or A) can be similar or at least about 5 times, and even up to about 20 times, greater than the melt viscosity of an adjacent flowstream of polymer A (or B).

In melt processing films of stiff and flexible materials, the differences in elastic stresses generated at the interface between the layers of different polymers is also important. Preferably, these elastic differences are minimized to reduce or eliminate flow instabilities that can lead to layer breakup. With knowledge of a material's elasticity, as measured by the storage modulus on a rotational rheometer over a range of frequencies (0.001 rad/sec.<ω<100 rad/sec.) at the processing temperature, along with its viscosity at shear rates less than 0.01 second$^{-1}$, and the degree to which the material's viscosity decreases with shear rate, one of skill in the art can make judicious choices of the relative thicknesses of the layers, the die gap, and the flow rate to obtain a film with continuous, uniform layers.

Significantly, relatively incompatible materials (i.e., those that typically readily delaminate as in conventional two layer constructions) can be used in the multilayer films of the present invention. Although they may not be suitable for all constructions, they are suitable for the constructions having larger numbers of layers. That is, generally as the number of layers increases, relatively incompatible materials can be used without delamination occurring.

If desired a functional layer may be applied to one or both of the major surfaces of the film of the invention. For example, an adhesive layer may be applied to at least one of the major surfaces. The adhesive layer may be activated by pressure, heat, solvent or any combination thereof and may be of any type based on a poly(α olefin), a block copolymer an acrylate, a rubber/resin, or a silicone. The adhesive may be applied at conventional coating weights (e.g., 0.0001 to 0.02 g/cm$^2$) using any conventional coating means such a rotary rod die, slot die or a gravure roll.

Other functional layers may also be employed. Thus, for example, an abrasive material (optionally in a binder), a light sensitive layer or an ink-receptive layer may be employed. Low adhesion back sizes (LABs) which restrict adhesion of various types of surfaces to the film when it is wound as a coil or is stacked on itself may also be employed as a functional layer. Ink receptive surfaces comprise materials that have an affinity for the binder used in inks. With an ink receptive layer, the multilayer films of the invention may be used for graphics applications whereby images, graphics and/or text is transferred to the film by any conventional means such as screen printing or heat transfer techniques. Still other functional layers may be employed if desired. They may be employed singly or in combination with other functional layers on one or both sides of the film. For example, the present invention also provides a graphics films comprising the multilayer film, a ink-receptive layer disposed on one major surface of the film, an adhesive layer (such as a pressure-sensitive adhesive) on the other major surface, and a release liner secured to the adhesive layer.

The film may also be treated with a conventional primer coating, and/or activated by flame or corona discharge, and/or by other surface treatment to enhance adhesion of the functional layer thereto.

When an additional pressure sensitive adhesive (psa) layer is used, pressure sensitive adhesives useful in the present invention can be self tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-α-olefins, and tackified silicones. Examples of suitable pressure sensitive adhesives are described in U.S. Pat. No. Re 24,906 (Ulrich), U.S. Pat. No. 4,833,179 (Young et al.), U.S. Pat. No. 5,209,971 (Babu et al.), U.S. Pat. No. 2,736, 721 (Dexter), and U.S. Pat. No. 5,461,134 (Leir et al.), for example. Others are described in the *Encyclopedia of Polymer Science and Engineering*, vol. 13, Wiley-Interscience Publishers, New York, 1988, the *Encyclopedia of Polymer Science and Technology*, vol. 1, Interscience Publishers, New York, 1964 and *Handbook of Pressure-Sensitive Adhesives*, D. Satas, Editor, 2$^{nd}$ Edition, Von Nostrand Reinhold, N.Y., 1989.

Other additives, such as fillers, pigments, crosslinking agents, flame-retardants, antioxidants, ultraviolet stabilizers, and the like, may be added to modify the properties of either the stiff (A or A') or the flexible (B) layers. Each of these additives is used in an amount to produce the desired result. Pigments and fillers can be used to modify cohesive strength and stiffness, as well as chemical resistance and gas permeability. For example, clays, hydrated silicas, calcium silicates, silico-aluminates, and the fine furnace and thermal blacks increase cohesive strength and stiffness. Platy pigments and fillers, such as mica, graphite, and talc, are preferred for acid and chemical resistance and low gas permeability. Other fillers can include glass or polymeric beads or bubbles, metal particles, fibers, and the like. Typically, pigments and fillers are used in amounts of about 0.1% to about 50% by weight, based on the total weight of the multilayer film. Pigments and fillers may also be used to modify the optical properties of the film such as the color, opacity and gloss.

Crosslinkers such as benzophenone, derivatives of benzophenone, and substituted benzophenones such as acryloyloxybenzophenone may also be added, and may be used to increase the modulus of the polymer of either layer. Such crosslinkers are preferably not thermally activated, but are activated by a source of radiation such as ultraviolet or electron-beam radiation subsequent to forming the films. Typically, crosslinkers are used in amounts of about 0.1% to about 5.0% by weight, based on the total weight of the multilayer film.

Flame retardants may be added to incorporate resistance to flame initiation or flame propagation in the constructions of the invention. Examples include brominated aromatic compounds, such as decabromodiphenyloxide available under the trade designation DE83R from Great Lakes Chemical Corp., W. Lafayette, Ind., antimony compounds, such as antimony trioxide or antimony pentoxide, and aluminum trihydrate, such as that available under the trade designation MICRALATH 1500 from Solem Ind., Norcross, Ga. Typically, flame retardants are used in amounts of about 1% to about 50% by weight, based on the total weight of the multilayer film. A flame retardant polyethylene concentrate is commercially available under the trade designation PE concentrate 1 Nat-2P-W from M. A. Hanna Company., Elk Grove, Ill., which contains a flame retardant blend of a brominated imide, antimony trioxide and polyethylene polymer. Flame retardants may be added to the multilayer films of the invention using the specific flame retardants and amounts described in WO 99/28128, the disclosure of which is herein incorporated by reference.

Antioxidants and/or ultraviolet stabilizers, including hindered amine light stabilizers (HALs) may be used to protect against severe environmental aging caused by ultraviolet light or heat. These include, for example, hindered phenols, amines, and sulfur and phosphorus hydroxide decomposers. Typically, antioxidants and/or ultraviolet stabilizers are used in amounts of about 0.1% to about 5.0% by weight, based on the total weight of the multilayer film.

Tie layers, which are typically hot melt adhesives (i.e., tacky when in the melt state), can also be used to enhance the adhesion between each of the layers if so desired. Materials useful in the tie layers include, but are not limited to, ethylene/vinyl acetate copolymer (preferably containing at least about 10% by weight of vinyl acetate units), carboxylated ethylene/vinyl acetate copolymer such as that available under the trade designation CXA3101™, from E.I. DuPont de Nemours, Inc., copolymers of ethylene and methyl acrylate such as that commercially available under the trade designation POLY-ETH 2205 EMA™, from Gulf Oil and Chemicals Co., ethylene/(meth)acrylic acid copolymer such as that available under the trade designation SURLYN™ from E.I. DuPont de Nemours, Inc., maleic anhydride modified polyolefins and copolymers of polyolefins such as that commercially available under the trade designation MODIC™, from Mitsubishi Chemical Co., polyolefins containing homogeneously dispersed vinyl polymers such as those commercially available under the trade designation VMX™ from Mitsubishi Chemical Co. (e.g., FN-70, an ethylene/vinyl acetate based product having a total vinyl acetate content of 50% and JN-70, an ethylene/vinyl acetate based product containing dispersed polymethylmethacrylate and having a vinyl acetate content of 23% and a methyl methacrylate content of 23%), POLYBOND™ (believed to be a polyolefin grafted with acrylic acid) from B. P. Chemicals Inc., Cleveland, Ohio. PLEXAR™ (believed to be a polyolefin grafted with functional groups) from Quantum Chemicals, Inc., Cincinnati, Ohio, a copolymer of ethylene and acrylic acid such as that commercially available under the trade designation PRIMACOR™ from Dow Chemical Co., Midland, Mich., a copolymer of ethylene and methacrylic acid such as that commercially available under the trade designation NUCREL™ from E. I. DuPont de Nemours, Inc and a terpolymer containing ethylene, glycidyl methacrylate, and methyl methacrylate available as LOTADER™ AX 8900 from Elf Atochem North America, Philadelphia, Pa.

The multilayer films of the present invention can be used as the backings or substrates for single-sided or double-sided adhesive products, such as tapes. Such films can be prepared using extrusion techniques, then coated or co-extruded with a low-adhesion backsize (LAB) material, which restricts adhesion of various types of surfaces to the film when it is wound as a coil or is stacked on itself. A wide variety of known adhesive materials (e.g., any of the pressure sensitive materials described herein) and LAB materials (e.g., polyolefins, acrylates, urethanes, cured silicones, fluorochemicals) can be used as well as a wide variety of known coating techniques, including solvent coating and extrusion or co-extrusion coating techniques.

Multilayer films of the present invention can be made using a variety of equipment and a number of melt-processing techniques (typically, extrusion techniques) well known in the art. Such equipment and techniques are disclosed, for example, in U.S. Pat. No. 3,565,985 (Schrenk et al.), U.S. Pat. No. 5,427,842 (Bland et al.), U.S. Pat. No. 5,589,122 (Leonard et al.), U.S. Pat. No. 5,599,602 (Leonard et al.), and U.S. Pat. No. 5,660,922 (Herridge et al.). For example, single- or multi-manifold dies, full moon feedblocks (such as those described in U.S. Pat. No. 5,389,324 to Lewis et al.), or other types of melt processing equipment can be used, depending on the number of layers desired and the types of materials extruded.

For example, one technique for manufacturing multilayer films of the present invention can use a coextrustion technique, such as that described in International Publication No. WO 93/07228 or U.S. Pat. No. 5,660,922 (Herridge et al.). In a coextrusion technique, various molten streams are transported to an extrusion die outlet and joined together in proximity of the outlet. Extruders are in effect the "pumps" for delivery of the molten streams to the extrusion die. The precise extruder is generally not critical to the process. A number of useful extruders are known and include single and twin screw extruders, batch-off extruders, and the like. Conventional extruders are commercially available from a variety of vendors such as Davis-Standard Extruders, Inc. (Pawcatuck, Conn.), Black Clawson Co. (Fulton, N.Y.), Berstorff Corp. (NC), Farrel Corp. (CT), and Moriyama Mfg. Works, Ltd. (Osaka, Japan).

Other pumps may also be used to deliver the molten streams to the extrusion die. They include drum loaders, bulk melters, gear pumps, and the like, and are commercially available from a variety of vendors such as Graco LTI (Monterey, Calif.), Nordson (Westlake, Calif.), Industrial Machine Manufacturing (Richmond, Va.), and Zenith Pumps Div., Parker Hannifin Corp. (NC).

Typically, a feedblock combines the molten streams into a single flow channel. The distinct layers of each material are maintained because of the laminar flow characteristics of the streams. The molten structure then passes through an extrusion die, where the molten stream is reduced in height and increased in width so as to provide a relatively thin and wide construction. This type of coextrusion is typically used to manufacture multilayer film constructions having about 5 layers or more.

However, the use of a feedblock is optional, as a variety of coextrusion die systems are known. For example, multi-manifold dies may also be employed, such as those commercially available from The Cloeren Company (Orange, Tex.). In multi-manifold dies, each material flows in its own manifold to the point of confluence. In contrast, when feedblocks are used, the materials flow in contact through a single manifold after the point of confluence. In multimanifold die manufacturing, separate streams of material in a flowable state are each split into a predetermined number of smaller or sub-streams. These smaller streams are then combined in a predetermined pattern of layers to form an array of layers of these materials in a flowable state. The layers are in intimate contact with adjacent layers in the array. This array generally comprises a stack of layers which is then compressed to reduce its height. In the multimanifold die approach, the film width remains constant during compression of the stack, while the width is expanded in the feedblock approach. In either case, a comparatively thin, wide film results. Layer multipliers in which the resulting film is split into a plurality of individual subfilms which are then stacked one upon another to increase the number of layers in the ultimate film may also be used. The multimanifold die approach is typically used in manufacturing multilayer film constructions having less than about 5 layers.

In manufacturing the films, the materials may be fed such that either the stiff material or the flexible material forms the outermost layers. The two outermost layers are often formed from the same material. Preferably, although not necessarily, the materials comprising the various layers are processable at the same temperature. Significantly, although it has been generally believed that the melt viscosities of the various layers should be similar, this is not a necessary requirement of the methods and products of the present invention. Accordingly, residence times and processing temperatures may have to be adjusted independently (i.e., for each type of material) depending on the characteristics of the materials of each layer.

Other manufacturing techniques, such as lamination, coating, or extrusion coating may be used in assembling multilayer films and products from such multilayer films according to the present invention. For example, in lamination, the various layers of the film are brought together under temperatures and/or pressures (e.g., using heated laminating rollers or a heated press) sufficient to adhere adjacent layers to each other.

Continuous forming methods include drawing a pressure sensitive adhesive composition out of a film die and subsequently contacting a moving multilayer film. After forming, the pressure sensitive adhesive coatings are solidified by quenching using both direct methods, such as chill rolls or water baths, and indirect methods, such as air or gas impingement.

The films of the present invention may also be annealed to minimize or eliminate necking in the film, to relieve asymmetric stresses in the film that give rise to shrinking, and to improve the dimensional stability. Commonly, the films are coextruded and then they are run over hot rolls, through a heated oven or subjected to an IR heater. It is desirable to heat treat the films under minimal tension so that the asymmetric stresses are relieved.

The films of the present invention can be oriented, either uniaxially (i.e., substantially in one direction) or biaxially (i.e., substantially in two directions), if so desired. Such orientation can result in improved strength properties, as evidenced by higher modulus and tensile strength. Preferably, the films are prepared by co-extruding the individual polymers to form a multilayer film and then orienting the film by stretching at a selected temperature. For example, uniaxial orientation can be accomplished by stretching a multilayer film construction in the machine direction at a temperature of about the melting point of the film, whereas biaxial orientation can be accomplished by stretching a multilayer film construction in the machine direction and the cross direction at a temperature at about the melting point of the film. Optionally heat-setting at a selected temperature may follow the orienting step.

Each of the patents, patent applications, and publications cited herein is incorporated by reference as if each were individually incorporated by reference. The various modifications and alterations of this invention will be apparent to those skilled in the art without departing from the scope and spirit of this invention. This invention should not be restricted to that set forth herein for illustrative purposes only.

EXAMPLES

This invention is further illustrated by the following examples which are not intended to limit the scope of the invention. In the examples, all parts, ratios and percentages are by weight unless otherwise indicated. The following test methods were used to characterize the multilayer films.

Test Methods
Stress Relaxation Test

In order to determine the tendency of a film to lose stress over a short period of time, a stress relaxation test was performed. For the first part of the test, a film sample was mounted in the jaws of a tensile testing machine and strained at a constant rate of 600% per minute until the sample reached 100% elongation. The jaws were then stopped and the stress was observed for one minute under constant strain. The percent residual stress at one minute was defined as 100 times the stress at one minute divided by the initial stress at 100% strain.

Strain Recovery Test

In order to determine the tendency of the film to recover after being strained, a strain recovery test was performed. A strip of film was cut and the length was noted. The film was then strained to 100% at a strain rate of 600% per minute and held at 100% strain for one minute. The stress was then removed and the film was allowed to dwell for 24 hours, after which time the sample length was measured. The percent strain recovery at 24 hours was defined as 100 times the (length at 100% strain minus the length at 24 hours) divided by the initial length before straining.

Necking Test

The amount of necking for each sample was determined by examination of the stress strain curve for the sample. The curve was generated with a standard tensile/elongation method on an Instron mechanical testing frame operating at 30.5 cm/minute (12 inches/minute). Samples were of 12.7 mm (0.5 inches) width and gauge length of 50.8 mm (2 inches). Thickness of the samples depended on process conditions and was measured using a Ono Sokki Liner Thickness Gage. The necking percent was determined by noting the stress value (S1) at the point of initial maximum stress and the stress value (S2) at the following minimum stress. Necking is defined as $100\times(S1-S2)/S1$ and is reported as percent necking.

Shrinkage

Unrestrained linear thermal shrinkage of plastic film was measured according to ASTM D 1204. A film sample having a width of about 25.4 mm and a length of about 101.6 mm was cut with a die. The length direction was parallel to the direction in which the film was made or the machine direction (MD) Notches, for reference points, were made about 75 mm apart in the length direction. Each film sample was placed unrestrained for 10 minutes in an oven that had been set at one of three temperatures, 163° C., 149° C. or 135° C. Film shrinkage was measured upon removal for both the MD and cross-web direction (CD). MD % shrinkage was 100 times the change in distance between the notches divided by the initial distance between the notches. CD % shrinkage was 100 times the change in width divided by the initial width. The larger value was reported and was the MD % shrinkage unless otherwise indicated.

Materials Used

| Material | Description |
| --- | --- |
| EVOH 105 | Ethylene vinyl alcohol copolymer, 44 mole % ethylene, available from Eval Company of America, Lisle, Illinois. |
| Rexflex ™ WL101 | Significantly atactic polypropylene available from Huntsman Polypropylene Corp., Woodbury, New Jersey. |
| Bynel ™ 50E555 | Maleic anhydride graft polypropylene, available from Dupont Packaging and Industrial Polymers, Wilmington Delaware. Now available as Bynel ™ 50E631 |
| Filler A | A blend of a brominated imide, antimony trioxide and polyethylene polymer at a 33.75/11.25/55 weight ratio, available as PE Conc. 1 Nat-2P-W from M.A Hannah, Elk Grove Village, Illinois. |
| Fina ™ 3374 | Isotactic polypropylene, available from Fina Oil & Chem, Dallas, Texas. |
| Filler B | A hindered amine light stabilizer concentrate, available as 10407, from Ampacet Corporation, Tarrytown New York. |

-continued

Materials Used

| Material | Description |
| --- | --- |
| Filler C | A pigment concentrate of carbon black in 50 weight percent polyethylene, available as 12085 from Standridge Color Corporation, Social Circle Georgia. |
| Macromelt ™ 6900 | A flexible polyamide available from Henkel Adhesives, Elgin, Illinois. |
| Lotader ™ AX8900 | A terpolymer containing ethylene, glycidyl methacrylate, methyl methacrylate available from Elf Atochem North America, Phil., PA. |
| Engage ™ 8200 | A metallocene polymerized olefin, containing 24% octene comonomer available from Dow Chemical Co., Midland, Michigan. |
| EVOH F104 | Ethylene vinyl alcohol copolymer, 32 mole % ethylene, available from Eval company of America, Lisle, Illinois. |
| Lotader ™ AX8840 | A copolymer containing ethylene and glycidyl methacrylate available from Elf Atochem North America. |
| HIPS 484 | A high impact polystyrene, 52% elongation per ASTM D638 with strain rate of 51 mm/min, available from Dow Plastics, Midland, Michigan. |
| VM100 | A polymethylmethacrylate, 4% elongation per ASTM D638 with strain rate of 51 mm/min, available from AtoHaas Americas Inc., Philadelphia, Pennsylvania. |
| AMNO | A Nylon 12 polyamide, 400% elongation per ASTM D638 with strain rate of 51 mm/min, available from Elf Atochem, North America |
| Lexan ™ Pc 111N | A polycarbonate, about 125% elongation per ASTM D638 with strain rate of 51 mm/min, available from General Electric Company, Pittsfield, Massachusetts. |
| PPSC 912 | An ethylene-propylene copolymer with a melt index of 65, available as Profax SC 912 from Montell North America, Wilmington. Delaware. |
| Vitel ™ 4450 | An aromatic, saturated polyester resin, 420% elongation per ASTM D638 with strain rate of 51 mm/min, available from Bostik Inc., Middleton, Massachusetts. |
| LLDPE 6806 | Linear low density polyethylene, available from Dow Chemical Co., Midland, Michigan. |
| Bynel ™ 41E558 | Maleic anhydride graft linear low density polyethylene, available from Dupont Packaging and Industrial Polymers, Wilmington, Delaware |
| Primacor ™ 3440 | Poly(ethylene acrylic acid), available from Dow Plastics, Midland, Michigan. |
| EVOH G156 | Ethylene vinyl alcohol copolymer, 48 mole % ethylene, available from Eval Company of America, Lisle, Illinois. |
| Bynel 50E631 | Maleic anhydride graft polypropylene, 1% maleic anhydride, melt index 5.0, available from Dupont Packaging, Wilmington, Delaware |
| Topas 6017 | Transparent amorphous copolymer of norbornene and ethylene, 6% elongation per ASTM D638, Tg = 180° C., available from Ticona GmbH, Frankfurt, Germany |

Examples 1–10, Comparative Examples 1–4

Examples 1–10 illustrate the effect of number of layers in multilayer films having a construction $A(BA)_nBA$.

In Example 1, the stiff layers were made of EVOH E105 and conveyed in a Killion single screw extruder (KILLION Model KTS-125, 32 mm, having an L/D of 24/1, commercially available from Killion Extruder Inc., Cedar Grove, N.J.), operating with zone temperatures increasing from 182° C. to 221° C. to the "A" slots of a feedblock having 91 slots. The feedblock, made as described in U.S. Pat. No. 4,908,278 (Bland et al.), allowed two flow streams fed into the 91 slots in an alternating manner to come together in a multilayer flow stream having layers arranged as $A(BA)_{44}BA$. The temperature of both the feedblock and the die were set at 232° C. The flexible layers were made from a mixture of Rexflex™ WL101 and Bynel™ 50E555 premixed in a weight ratio of 40:60. The mixture was fed by a twin screw extruder (LEISTRITZ AG Model LSM 34 GL, 34 mm, having an L/D of 42/1, commercially available from American Leistritz Extruder Corp, Somerville, N.J.) operating with zone temperatures increasing from 121° C. to 232° C. into the "B" slots of the feedblock. The resulting multilayered flow stream was passed through a single orifice film die and drop cast onto a chrome chill roll set at a temperature of 24° C. and collected. The line speed was 6.7 m/min, the individual flowrates of A and B were such that the material in the stiff and flexible layers were in a weight ratio of 30:70 and the overall thickness was measured at 102 micrometers. Some of the construction was then annealed by placing the multilayer film in an air circulating oven set at 135° C. for 5 minutes unrestrained.

Example 2 was made as in Example 1, except the flow rates of the materials were adjusted to obtain a weight ratio of 50:50.

Example 3 was made as in Example 1, except the flow rates of the materials were adjusted to obtain a weight ratio of 70:30 and the feedblock had only 13 slots available for use.

Examples 4–6 were made as in Example 1, except the feedblock had only 5 slots available for use and the flow rates of the materials for Examples 4–6 were adjusted to obtain a weight ratio of 30:70, 50:50 and 70:30, respectively.

Examples 7–10 were made as in Example 1, except the stiff layers were made from EVOH G156 ethylene vinyl alcohol and the slots available for use in the feedblock were 5, 4, 3 and 2, respectively.

Comparative Example 1 was a polyvinyl chloride film, thickness of about 51 micrometers, used in the manufacture of Controltac™ 180-10 Graphic Marking Film available from 3M Company, St. Paul, Minn.

Comparative Example 2 was a polyvinyl chloride film, thickness of about 51 micrometers, used in the manufacture of Scotchcal™ 3650 Graphic Marking Film available from 3M Company, St. Paul, Minn.

Comparative Example 3 was a polyurethane film, thickness of about 51 micrometers, used in the manufacture of Controltac™ 190-10 Graphic Marking Film available from 3M Company, St. Paul, Minn.

Comparative Example 4 was polyolefin-based film, thickness of about 100 micrometers, used in the manufacture of Scotchcal™ 3540C Graphic Marking Film available from 3M Company, St. Paul, Minn.

Examples 1–10 and Comparative Examples 1–4 were tested for Modulus, Residual Stress and Strain Recovery. The test results and number of film layers are shown in Table 1.

As seen, the films of the invention exhibited reduced strain recovery and comparable stress relaxation to that seen with conventional graphic marking films.

Examples 4–7 and Comparative Examples 1–3 were tested for Necking. The test results are shown in Table 2.

As seen, annealing the film can substantially reduce necking when minimal necking is important.

Examples 11–13

Examples 11–13 illustrate the effect of filler on the conformability properties of multilayer film having a construction $A(BA)_nBA$.

Example 11 made in a manner similar to Example 1 except the materials were different and the process conditions were changed to make a multilayer film having 13 layers, a weight ratio of stiff material to flexible material of 80:20 and a overall thickness of about 114 micrometers. The stiff layer was made from Filler A and Rexflex™ WL101 that were premixed in a weight ratio of 75:25. Rexflex™ WL101 is a normally flexible material rendered stiff by the addition of the Filler A. The flexible layer was made from Rexflex™ WL101 and Fina™ 3374 that were premixed in a weight ratio of 75:25. Process temperatures were adjusted to accommodate the melt characteristics of the various materials.

Example 12 was made in a manner similar to Example 1 except the materials were different and the process conditions were changed to make a multilayer film having 5 layers, a weight ratio of stiff material to flexible material of 32:68 and a overall thickness of about 87 micrometers. The stiff layer was made from EVOH G156. The flexible layer was made from Rexflex™ WL101 and Bynel™ 50E555 that were premixed in a weight ratio of 40:60 and then augmented with Filler B in a weight ratio of flexible mixture to filler of 100:15. Process temperatures were adjusted to accommodate the melt characteristics of the various materials.

Example 13 was made in a manner similar to Example 1 except the flexible material was different and the process conditions were changed to make a multilayer film having 91 layers, a weight ratio of stiff material to flexible material of 30:70 and an overall thickness of about 79 micrometers. The flexible layer was made from Rexflex™ WL101, Bynel™ 50E555, Filler B and Filler C that were premixed in a weight ratio of 40:48:8:4. Process temperatures were adjusted to accommodate the melt characteristics of the various materials.

Examples 11–13 were tested for Modulus, Residual Stress and Strain Recovery. The test results and number of film layers are shown in Table 3.

TABLE 1

| | | Unannealed | | | Annealed | | |
|---|---|---|---|---|---|---|---|
| Example | Layers | Modulus MPa | Residual Stress % | Strain Recovery % | Modulus MPa | Residual Stress % | Strain Recovery % |
| 1 | 91 | 326 | 50 | 39 | 366 | 51 | 47 |
| 2 | 91 | 394 | 40 | 27 | 419 | 50 | 46 |
| 3 | 13 | 717 | 43 | 27 | 579 | 57 | 31 |
| 4 | 5 | 448 | 41 | 48 | 558 | 54 | 40 |
| 5 | 5 | 586 | 39 | 40 | 558 | 51 | 49 |
| 6 | 5 | 870 | 34 | 35 | 872 | 55 | 33 |
| 7 | 5 | 358 | 42 | 53 | 338 | 51 | 58 |
| 8 | 4 | 482 | 41 | 46 | 414 | 57 | 48 |
| 9 | 3 | 365 | 41 | 50 | 241 | 55 | 56 |
| 10 | 2 | 372 | 40 | 55 | 255 | 57 | 52 |
| C1 | 1 | 621 | 40 | 66 | — | — | — |
| C2 | 1 | 572 | 43 | 77 | — | — | — |
| C3 | 1 | 97 | 43 | 90 | — | — | — |
| C4 | 3 | 165 | 59 | 67 | — | — | — |

TABLE 2

| Example | Unannealed Necking percent | Annealed Necking percent |
|---|---|---|
| 4 | 14 | 2 |
| 5 | 19 | 4 |
| 6 | 33 | 10 |
| 7 | 16 | 1 |
| C-1 | 9 | x |
| C-2 | 7 | x |
| C-3 | 0 | x |

TABLE 3

| | | Unannealed | | | Annealed | | |
|---|---|---|---|---|---|---|---|
| Example | Layers | Modulus MPa | Residual Stress % | Strain Recovery % | Modulus MPa | Residual Stress % | Strain Recovery % |
| 11 | 13 | 234 | 45 | 43 | — | 49 | 61 |
| 12 | 13 | 338 | 44 | 45 | 352 | 54 | 46 |
| 13 | 91 | 338 | 49 | 43 | 359 | 52 | 50 |

As seen, fillers can be used without adversely affecting conformability of the film. Also, in some cases, fillers can have a significant effect on conformance. As previously noted, the stiff layer of Example 11 was a flexible polymer made stiff by the presence of a filler.

Examples 14–15

Examples 14–15 illustrate the effect of tie-layers on the conformability properties of multilayer films having a construction $AC(BCAC)_nBCA$, where layer C is a tie-layer.

Example 14 was made in a manner similar to Example 1 except a tie-layer layer was added, a third extruder was used to feed the tie-layer material to the C slots of a multilayer feedblock and the process conditions were changed. The tie-layer was made from Macromelt™ 6900. The tie-layer material was conveyed in a KILLION single screw extruder (KILLION, 19 mm, having an L/D of 32/1, commercially available from Killion Extruders Inc., Cedar Grove, N.J.), to C slots of a feedblock. Process temperatures were adjusted to accommodate the melt characteristics of the various materials. The process conditions were changed to make a multilayer film having 65 layers, a weight ratio of stiff material to tie-layer to flexible material of 50:15:35 and a overall thickness of about 115 micrometers.

Example 15 was made in a manner similar to Example 14 except the tie-layer and flexible layer were made from different materials. The tie-layer was made from Lotader™ AX8900 epoxy-functional polyethylene. The flexible layer was made from Engage™ 8200 ethylene/octene copolymer. The overall film thickness was about 101 micrometers.

Example 16 was made in a manner similar to Example 14 except the layers were made from different materials. The stiff layer, tie-layer and flexible layer were made from EVOH F104 with 32 mole % ethylene copolymer, Lotader™ AX8900 epoxy-containing polyethylene, and Engage™ 8200 ethylene/octene copolymer, respectively. The overall film thickness was about 109 micrometers.

Examples 14–16 were tested for Modulus, Residual Stress and Strain Recovery. The test results and number of film layers are shown in Table 4.

TABLE 4

| | | Unannealed | | | Annealed | | |
|---|---|---|---|---|---|---|---|
| Example | Layers | Modulus MPa | Residual Stress % | Strain Recovery % | Modulus MPa | Residual Stress % | Strain Recovery % |
| 14 | 65 | 338 | 38 | 29 | 614 | 56 | 30 |
| 15 | 65 | 476 | 38 | 39 | 455 | 51 | 39 |
| 16 | 65 | 627 | 40 | 44 | 696 | 55 | 42 |

As seen, tie-layers can be used without adversely affecting conformability properties. Each film was also tested for necking. The necking of the unannealed and annealed film of Example 14 was 14% and 2%, respectively. The necking of the unannealed and annealed film of Example 15 was 22% and 8%, respectively. The necking of the unannealed and annealed film of Example 16 was 19% and 10%, respectively.

Examples 17–26 and Comparative Example 5

Examples 17–26 illustrate the effect of changing different variables on the conformability properties of multilayer films having a construction $A(BA)_nBA$ or $B(AB)_n AB$.

The Examples 17–26 were made in a manner similar to Example 1 except the type of material in the stiff "A" layers and flexible "B" layers, the number of layers and the weight ratio of stiff to flexible material were varied. Process temperatures were adjusted to accommodate the melt characteristics of the various materials. These variables are shown in Table 5.

Comparative Example 5 was made as Example 19 except the weight ratio of stiff to flexible material was 50:50.

TABLE 5

| Example | "A" Material | "B" Material | Configuration | Ratio Stiff/Flexible |
|---|---|---|---|---|
| 17 | HIPS 484 | 50/50 wt % Rexflex™ WL101/ Bynel™ 50E555 | $B(AB)_{44}AB$ | 5/95 |
| 18 | VM100 | 50/50 wt % Rexflex™ WL101/ Bynel™ 50E555 | $B(AB)_{44}AB$ | 10/90 |
| 19 | VM100 | 50/50 wt % Rexflex™ WL101/ Bynel™ 50E555 | $B(AB)_{44}AB$ | 25/75 |
| C5 | VM100 | 50/50 wt % Rexflex™ WL101/ Bynel™ 50E555 | $B(AB)_{44}AB$ | 50/50 |
| 20 | Lexan™ PC 111N | 50/10/40 wt % Rexflex™ WL101/ Bynel™ 50E555/ AMNO Nylon 12 | $B(AB)_{44}AB$ | 10/90 |
| 21 | Vitel™ 4450 | 30/35/30 wt ratio Rexflex™ WL101/ Bynel™ 50E555/ PPSC912 | $B(AB)_{5}AB$ | 10/90 |
| 22 | EVOH E105 | Bynel™ 50E555 | $A(BA)_{44}BA$ | 50/50 |
| 23 | EVOH E105 | 30/70 wt % LDPE6806/ Bynel™ 41E558 | $A(BA)_{44}BA$ | 50/50 |
| 24 | EVOH E105 | Primacor™ EAA 3440 | $A(BA)_{44}BA$ | 56/44 |
| 25 | EVOH E105 | Lotader™ AX8840 | $A(BA)_{31}BA$ | 50/50 |
| 26 | EVOH G156 | 40/60 wt % Rexflex™ WL101/ Bynel™ 50E555 | $A(BA)_{44}BA$ | 50/50 |

Examples 17–26 were tested for Modulus, Residual Stress and Strain Recovery. The test results and number of film layers are shown in Table 6.

Comparative Example 6 was an extruded film made from a blend of Fina™ 3576, a stiff polypropylene, and Rexflex™ WL101, a flexible polypropylene, in a weight ratio of 60:40.

TABLE 6

| | Unannealed | | | Annealed | | |
|---|---|---|---|---|---|---|
| Example | Modulus MPa | Residual Stress % | Strain Recovery % | Modulus MPa | Residual Stress % | Strain Recovery % |
| 17 | 200 | 49 | 48 | 234 | 53 | 63 |
| 18 | 317 | 49 | 34 | 365 | 51 | 41 |
| 19 | 579 | 49 | 24 | 558 | 51 | 27 |
| C5 | 1041 | Too Brittle[1] | Too Brittle[1] | 972 | 51 | 25 |
| 20 | 241 | 56 | 31 | 241 | 62 | 36 |
| 21 | 172 | 50 | 44 | 234 | 52 | 59 |
| 22 | 469 | 46 | 28 | 469 | 53 | 41 |
| 23 | 482 | 55 | 39 | 441 | 57 | 48 |
| 24 | 483 | 52 | 37 | 490 | 54 | 63 |
| 25 | 476 | 38 | 39 | 524 | 54 | 43 |
| 26 | 434 | 43 | 34 | 434 | 52 | 46 |

[1]film tore before it could be stretched to 100 percent elongation.

As seen, satisfactory conformability performance can be obtained with constructions having a wide range of modulus. Weight ratios of stiff to flexible components tend to be lower when the material of the stiff layer is more brittle. As Comparative Example 5 illustrates, the multilayer film of the invention is too brittle if the weight ratio of a stiff material that has an elongation of less than 10% is too high.

Examples 27–29 and Comparative Examples 6–8

Examples 27–29 illustrate the effect of shrinkage on the multilayer films of the invention. Samples of Examples 27–29 were made as Examples 1, 2 and 22, respectively.

The film was made according to U.S. Ser. No. 09/119494, "Polymer Blends and Tapes Therefrom" (Kollaja, et al), Example 2 except Fina™ 3576 was used instead on Escorene™ 4792E1 ethylene/propylene copolymer.

Comparative Example 7 was a calendered plasticized polyvinyl chloride film available as Renolit™ SK-M Signmask Blue from American Renolit Corp., Whippany, N.J.

Comparative Example 8 was a calendered plasticized polyvinyl chloride film available as Renolit™ S from American Renolit Corp.

All examples were tested for Shrinkage. The test results are shown in Table 7.

TABLE 7

| | Shrinkage | | | | | |
|---|---|---|---|---|---|---|
| | Unannealed | | | Annealed | | |
| Example | 163° C. | 149° C. | 135° C. | 163° C. | 149° C. | 135° C. |
| 27 | 2.9 | 1.8 | 1.8 | 5.5 | 0 | 1.8 |
| 28 | 3.5 | 1/1 | 1.1 | 1.5 | 0 | 1.1 |
| 29 | 0 | 0 | 0 | 1.4 | 0 | 0 |
| C6 | melts | 4 | — | melts | 0.7 | — |
| C7 | 13 | 12 | 18 | — | — | — |
| C8 | 7 | 7 | 7 | — | — | — |

As seen, the shrinkage over the temperatures used was significantly less for Examples 27–29 than that observed for the comparative example polyvinyl chloride films. Also, the films of the invention were more dimensionally stable (less shrinkage) at 163° C. than the comparative film made from a polypropylene blend (C6).

Examples 30–32 and Comparative Examples 9–11

Examples 30–32 illustrate a comparison of the films of the invention to known films having similar weight ratios of differently described components.

Example 30 was made in a manner similar to Example 1 except the stiff and flexible materials were changed, a tie-layer layer was added, a third extruder was used to feed the tie-layer material to the C slots of a multilayer feedblock, the feedblock had 25 slots and the process conditions were changed. The tie-layer was made from Bynel 50E631. The tie-layer material was conveyed in a KILLION single screw extruder (KILLION, 19 mm, having an L/D of 32/1) to C slots of the feedblock. The stiff-layer material was EVOH G156 and the flexible-layer material consisted of Rexene WL101. Process temperatures were adjusted to accommodate the melt characteristics of the various materials. The process conditions were changed to make a multilayer film having 25 layers arranged in a (ACBC)$_6$A configuration, a weight ratio of stiff material to tie-layer material to flexible material of 65:20:15 and a overall thickness of about 106 micrometers.

Example 31 and 32 were made in a manner similar to Example 30 except the weight ratio of stiff material to tie-layer material to flexible material was 39:21:40 and 26:20:54, respectively, and the overall thickness was about 103 and 106 micrometers, respectively.

Comparative Example 9 was made in a manner similar to Example 30 except the layers were made from different materials. Brittle layers, tie layers and ductile layers were made from polymethylmethacrylate (available as PMMA V044 from AtoHaas Americas Inc., Philadelphia, Pa.), ethylene vinyl acetate (available as Elvax 3190 from Dupont Packaging and Industrial Polymers, Wilmington, Del.) and polypropylene (available as PP3374 from Fina Oil & Chemical, Dalllas, Tex.), respectively. The weight ratio of brittle material to tie-layer to ductile material was 65:20:15 and the overall thickness was about 128 micrometers.

Comparative Example 10 and 11 were made in a manner similar to Comparative Example 9 except the weight ratio of brittle material to tie-layer material to ductile material was 39:21:40 and 26:20:54, respectively, and the overall thickness was about 103 and 106 micrometers, respectively.

Examples 30–32 and Comparative Examples 9–11 were tested for Modulus, Residual Stress and Strain Recovery. The test results are shown in Table 8.

TABLE 8

| | Unannealed | | | Annealed[2] | | |
|---|---|---|---|---|---|---|
| Example | Modulus MPa | Residual Stress % | Strain Recovery % | Modulus MPa | Residual Stress % | Strain Recovery % |
| 30 | 295 | 49 | 48 | 306 | 53 | 63 |
| 31 | 460 | 46 | 56 | 486 | 57 | 54 |
| 32 | 440 | 43 | 47 | 544 | 56 | 43 |
| C9 | 1619 | Too Brittle[1] | Too Brittle[1] | 1637 | Too Brittle[1] | Too Brittle[1] |
| C10 | 1278 | Too Brittle[1] | Too Brittle[1] | 1158 | Too Brittle[1] | Too Brittle[1] |
| C11 | 862 | Too Brittle[1] | Too Brittle[1] | 960 | Too Brittle[1] | Too Brittle[1] |

[1]film tore before it could be stretched to 100 percent elongation.
[2]annealing was done at 135° C. for 10 minutes.

As seen, satisfactory conformability performance can be obtained with constructions of the invention having a variety of weight ratios of stiff-layer materials, tie-layer materials and flexible-layer materials. Films taught in U.S. Pat. No. 4,908,278 (Bland et al.) having similar weight ratios of a brittle-layer material, a tie-layer material and a ductile-layer material tear before they can be stretched to 100 percent elongation as described in the Stress Relaxation Test and Strain Recovery Test used to evaluate films of the invention.

All examples were tested for elongation at various strain rates to determine the effect of strain rate on elongation in the down-web direction. The test results are shown in Table 9.

TABLE 9

| | Elongation to Break at Strain Rate of | | | |
|---|---|---|---|---|
| Example | 50%/min | 100%/min | 600%/min | 2500%/min |
| 30 | 782 | 781 | 765 | 591 |
| 31 | 637 | 571 | 491 | 423 |
| 32 | 548 | 578 | 529 | 349 |

TABLE 9-continued

| | Elongation to Break at Strain Rate of | | | |
|---|---|---|---|---|
| Example | 50%/min | 100%/min | 600%/min | 2500%/min |
| C9 | 4 | 5 | 5 | 6 |
| C10 | 21 | 18 | 7 | 0 |
| C11 | 17 | 17 | 19 | 0 |

As seen, the films of the invention had elongation-to-break values of well over 100% for all strain rates. In contrast, the comparative films all had elongation-to-break values that were well under 100% for all strain rates and thus were too brittle to be conformable.

Examples 33–42

Examples 33–42 illustrate the effect on properties of multilayer conformable films of stiff layers composed of a mixture of two polymers each having a modulus over 207 MPa (30,000 psi).

Example 33 was made in a manner similar to Example 1 except different stiff-layer materials and different equipment were used and the process conditions were changed. The stiff-layer material was made from a mixture of Fina 3374 (Youngs Modulus of 1724 MPa) and Topas 6017 (Youngs Modulus of 3203 MPa) pre-mixed in a weight ratio of 90:10. The stiff-layer material was conveyed in a single screw extruder (Extrudex, 30 mm, having an L/D of 30/1, commercially available from Extrudex GmbH Postfach 1220-75402 Muhlacker, Germany) to A slots of a feedblock having 21 slots. The flexible-layer material was made from a mixture of Rexene WL101 and Fina 3374 that were pre-mixed in a weight ratio of 60:40. The flexible-layer material was conveyed in a single screw extruder (Plastik Maschinenbau, 45 mm, having an L/D of 30/1, available from Plastik Maschinenbau, Industriegebiet, 53539 Kelberg/Eifel, Germany) to the B slots of the feedblock. Process temperatures were adjusted to accommodate the melt characteristics of the various materials. The process conditions were changed to make a multilayer film having 21 layers, a weight ratio of stiff material to flexible material of 13:87 and an overall thickness of about 124 micrometers.overall thickness of Examples 34 to 42 were about 157, 157, 152, 117, 135, 104, 104, 109 and 109 micrometers, respectively. Also, the weight ratio of stiff material to flexible material for Example 42 was changed to 7:93.

Examples 33–42 were tested for Modulus, Residual Stress and Strain Recovery. The test results are shown in Table 10.

TABLE 10

| | Unannealed | | | Annealed | | |
|---|---|---|---|---|---|---|
| Example | Modulus MPa | Residual Stress % | Strain Recovery % | Modulus MPa | Residual Stress % | Strain Recovery % |
| 33 | 248 | 49 | 51 | 220 | 57 | 55 |
| 34 | 262 | 52 | 38 | 333 | 58 | 44 |
| 35 | 289 | 54 | 29 | 298 | 57 | 39 |
| 36 | 331 | 52 | 48.5 | 394 | 58 | 34 |
| 37 | 284 | 55 | 28.5 | 400 | 57 | 34 |
| 38 | 321 | 57 | 28 | 322 | 58 | 29 |
| 39 | 402.0 | 62 | 27 | 447 | 59 | 27 |
| 40 | 357 | 60 | 24 | 454 | 58 | 27 |
| 41 | 368 | 57 | 22 | 482 | 61 | 26 |
| 42 | 281 | 59 | 28 | 246 | 59 | 30 |

As seen, satisfactory conformability performance can be obtained with construction of the invention having a stiff-layer material, composed of more than one polymer.

Examples 33–42 were tested for Necking. The test results are shown in Table 11.

TABLE 11

| Example | Unannealed Necking percent | Annealed Necking percent |
|---|---|---|
| 33 | 12 | 0 |
| 34 | 15 | 0.5 |
| 35 | 17 | 0 |
| 36 | 18 | 0 |
| 37 | 17 | 0 |
| 38 | 18 | 0 |
| 39 | 19 | 2 |
| 40 | 16 | 0 |
| 41 | 21 | 3 |
| 42 | 11 | 0 |

As seen, some compositions of the invention exhibit little if any necking in the annealed state.

All examples were tested for Shrinkage. The test results are shown in Table 12.

TABLE 12

| | Shrinkage | | | |
|---|---|---|---|---|
| | Unannealed | | Annealed | |
| Example | 163° C. | 149° C. | 163° C. | 149° C. |
| 33 | 0.9 | 0.8 | 0.8 | 0 |
| 34 | 0.7 | 0.8 | 0.6 | 0.8 |
| 35 | 0.8 | 0.8 | 0 | 0.8 |
| 36 | 2.0 | 0.7 | 0 | 0 |
| 37 | 0.8 | 0.8 | 1.0 | 0 |

TABLE 12-continued

| | Shrinkage | | | |
|---|---|---|---|---|
| | Unannealed | | Annealed | |
| Example | 163° C. | 149° C. | 163° C. | 149° C. |
| 38 | 0.8 | 1.6 | 0 | 0.8 |
| 39 | 0 | 0 | 0 | 0 |
| 40 | 0.9 | 0 | 0.7 | 0.8 |
| 41 | 2.0 | 0 | 0.7 | 0.8 |
| 42 | 0 | 0 | 0 | 0 |

As seen, little if any shrinkage was observed over the temperatures used.

What is claimed is:

1. A multilayer film having a unified construction of at least 5 contiguous layers of organic polymeric material, comprising a stiff material alternating with layers comprising a flexible material, wherein said multilayer article exhibits a strain recovery of 55% or less, and a Young's modulus of 10,000 to 150,000 psi at room temperature and an elongation of 100% or greater at a strain rate of 600% per minute.

2. The multilayer film of claim 1 having a residual stress of 60% or less.

3. The multilayer film of claim 1 having a total thickness of no greater than 250 micrometers.

4. The multilayer film of claim 1 wherein said flexible material comprises a polymeric material having a Young's modulus of less than 25,000 psi.

5. The multilayer film of claim 4 wherein said flexible material has an elongation of at least 100% at a strain rate of 600% per minute.

6. The multilayer film of claim 4 wherein said flexible material is selected from the group consisting of homo- and copolymers of ethylene, propylene, butene and blends thereof.

7. The multilayer film of claim 6 wherein said copolymers are selected from the group consisting of copolymers of ethylene with vinyl acetate, acrylic acid, methyl methylacrylate, methacrylic acid, and alpha-olefins; maleic anhydride grafted polyethylene and maleic anhydride grafted polypropylene.

8. The multilayer film of claim 4 wherein said flexible materials are selected from the group consisting of polyacrylates, polyamides, polyester resins and polyurethanes.

9. The multilayer film of claim 1 wherein said flexible material comprises a polymeric material having a Young's modulus of less than 10,000 psi.

10. The multilayer film of claim 1 wherein said stiff material comprises a polymeric material having a Young's modulus of 30,000 to 150,000 psi.

11. The multilayer film of claim 10 wherein the stiff material has an elongation of 100% or less at a strain rate of 600% per minute.

12. The multilayer film of claim 10 wherein the stiff material has an elongation of 10% or greater at a strain rate of 600% per minute.

13. The multilayer film of claim 10 wherein said stiff material comprises a polymeric material having a Young's modulus of greater than 50,000 psi.

14. The multilayer film of claim 10 wherein said stiff material is selected from the group of homo- and copolymers of methyl methacrylate, styrene, alkyl styrenes, acrylonitrile and methacrylonitnie; copolymer of ethylene and vinyl alcohol; polyesters; polyamides; polyarethanes; copolymers of ethylene and cyclic olefins; high modulus polypropylenes and polycarbonates.

15. The multilayer film of claim 10 wherein said stiff material is an ethylene-norbornene copolymer.

16. The multilayer film of claim 1 having necking of 25% or less as measured by ASTM D882-95A.

17. The multilayer film of claim 16 having necking of 5% or less.

18. The multilayer film of claim 1 further comprising a layer of pressure sensitive adhesive.

19. The multilayer film of claim 1 having internal layers of no greater than 5 micrometers thick.

20. The multilayer film of claim 1 comprising a layer comprising a stiff material, a layer comprising a flexible material, and a tie layer therebetween.

21. The multilayer film of claim 1 further comprising an ink-receptive layer.

22. The multilayer film of claim 1 having Young's modulus of 10,000 to 50,000 psi.

23. The film of claim 1 having a Young's modulus from 50,000 to 150,000 psi.

24. The multilayer film of claim 1 having a shrinkage of 5% or less when tested according to ASTM D 1204.

25. The multilayer film of claim 1 comprising from 20 to 95 percent by weight flexible material.

26. The multilayer film of claim 1 comprising from 30 to 55 percent by weight of the flexible material.

27. The multilayer film of claim 1 comprising less than 10 weight percent of the stiff layer, said stiff material having an elongation of less than 10% at a strain rate of 600% per minute.

28. A process of preparing a multilayer film having a Young's modulus of 10,000 to 150,000 psi at room temperature, a strain recovery of 55% or less, and an elongation of 100% or greater at a strain rate of 600% per minute the process comprising melt processing organic polymeric material to form a unified construction of at least 5 contiguous layers of organic polymeric material, the construction comprises layer, comprising a stiff material alternating with layers comprising a flexible material.

29. The process of claim 28 wherein all the layers are simultaneously melt processed.

30. The process of claim 28 wherein all the layers are simultaneously coextruded.

31. The process of claim 28, further comprising the step of annealing the multilayer film.

* * * * *

UNITED STATES PATENT AND TRADEMARK OFFICE
CERTIFICATE OF CORRECTION

PATENT NO. : 6,579,601 B2
APPLICATION NO. : 09/778523
DATED : June 17, 2003
INVENTOR(S) : Richard A. Kollaja It is certified that error appears in the above-identified patent and that said Letters Patent is hereby corrected as shown below:

Column 2
Line 6, delete "(em)" and insert --(μm)--, therefore

Column 5
Line 65, delete "GRILONT" and insert --GRILON™--, therefore

Column 10
Line 42, delete "(HALs)" and insert --(HALS)--, therefore

Column 18
Line 6, delete "film" and insert --films--, therefore

Line 8, after "11" insert --was--

Column 22
Above Table 6, delete "Comparative Example 6 was an extruded film made from a blend of Fina™ 3576, a stiff polypropylene, and Rexflex™ WL101, a flexible polypropylene, in a weight ratio of 60:40." and insert in Column 23, Line 1, therefore Line 67, below "respectively" insert --Comparative Example 6 was an extruded film made from a blend of Fina™ 3576, a stiff polypropylene, and Rexflex™ WL101, a flexible polypropylene, in a weight ratio of 60:40.--

Column 26
Lines 3-7, after "micrometers." delete "overall thickness of Examples 34 to 42 were about 157, 157, 152, 117, 135, 104, 104, 109, and 109 micrometers, respectively. Also, the weight ratio of stiff material to flexible material for Example 42 was changed to 7:93." and insert --Examples 34 to 42 were made in a manner similar to Example 35 except the weight ratio of Fina and Topas in the stiff material were varied as 80:20, 70:30, 60:40, 50:50, 40:60, 30:70, 20:80, 10:90 and 0:100, respectively. The overall thickness of Examples 34 to 42 were about 157, 157, 152, 117, 135, 104, 104, 109 and 109 micrometers, respectively. Also, the weight ratio of stiff material to flexible material for Example 42 was changed to 7:93.--, therfore (on line 4 as a new paragraph)

Line 31, delete "construction" and insert --constructions--, therefore

UNITED STATES PATENT AND TRADEMARK OFFICE
CERTIFICATE OF CORRECTION

PATENT NO. : 6,579,601 B2
APPLICATION NO. : 09/778523
DATED : June 17, 2003
INVENTOR(S) : Richard A. Kollaja It is certified that error appears in the above-identified patent and that said Letters Patent is hereby corrected as shown below:

<u>Column 28</u>
Line 8, in claim 14, delete "polyarethanes" and insert --polyurethanes--, therefore Line 48, in claim 28, delete "layer," and insert --layers--, therefore Signed and Sealed this Third Day of October, 2006

JON W. DUDAS
*Director of the United States Patent and Trademark Office*